United States Patent [19]
Maeda

[11] Patent Number: 5,869,568
[45] Date of Patent: Feb. 9, 1999

[54] ONE-PART COLD CROSSLINKING EMULSION COMPOSITION AND METHOD OF MANUFACTURING THE SAME

[75] Inventor: Norihisa Maeda, Osaka, Japan

[73] Assignee: National Starch and Chemical Investment Holding Corporation, Wilmington, Del.

[21] Appl. No.: 969,086

[22] Filed: Nov. 12, 1997

[30] Foreign Application Priority Data

Dec. 5, 1996 [JP] Japan .................................. 8-325636

[51] Int. Cl.[6] .............................. C08L 29/04; C08F 8/00
[52] U.S. Cl. .......................... 524/802; 528/271; 525/63; 525/69; 525/88; 525/90; 525/94; 525/108; 525/119; 525/185; 525/191; 524/801; 524/804; 524/845
[58] Field of Search ............................. 528/271; 525/63, 525/69, 88, 90, 94, 108, 119, 185, 191; 524/801, 802, 804, 845

[56] References Cited

U.S. PATENT DOCUMENTS

| | | |
|---|---|---|
| 4,691,045 | 9/1987 | Fukuchi et al. .......................... 560/185 |
| 5,708,059 | 1/1998 | Pfeil et al. ............................... 523/423 |
| 5,728,790 | 3/1998 | Seki et al. ................................ 526/273 |
| 5,744,540 | 4/1998 | Baumstark et al. ..................... 524/558 |
| 5,747,578 | 5/1998 | Schmitz et al. ......................... 524/502 |
| 5,773,519 | 6/1998 | Ito et al. ................................. 525/276 |
| 5,789,506 | 8/1998 | Toribuchi et al. ...................... 526/214 |

FOREIGN PATENT DOCUMENTS

| | | |
|---|---|---|
| 590279969 | 8/1982 | Japan . |
| 06073308 | 3/1984 | Japan . |
| WO 95/09890 | 10/1993 | WIPO . |
| WO 95/17450 | 12/1993 | WIPO . |

Primary Examiner—Samuel A. Acquah
Attorney, Agent, or Firm—Ellen T. Dec

[57] ABSTRACT

A one-part cold crosslinking emulsion composition containing, in an aqueous medium, a double-structure fine grain comprising the following Component (A) 1 and the following Component (B) 2 covering the same, wherein the following Component (C) is contained in Component (B) 2:

(A) a copolymer comprising an epoxy group-containing monomer and an ethylenic unsaturated monomer;
(B) a copolymer comprising an unsaturated carboxylic acid and an ethylenic unsaturated monomer; and
(C) a low molecular weight monofunctional epoxy compound.

4 Claims, 9 Drawing Sheets

1: Component (A)
2: Component (B)
3: Surface of a fine grain
4: Interface between Components (A) and (B)

$R-O-CH-CH_2$ with epoxide O: Component (C)

1: Component (A)
2: Component (B)
3: Surface of a fine grain
4: Interface between Components (A) and (B)

R-O-CH-CH₂ with epoxide O: Component (C)

1: Component (A)
2: Component (B)

R-O-CH-CH₂ with epoxide O: Component (C)

1: Component (A)
2: Component (B)

$$\text{R-O-CH-CH}_2 \overset{O}{\diagup\diagdown}$$ : Component (C)

1: Component (A)
2: Component (B)
3: Surface of a fine grain
4: Interface between Components (A) and (B)

[One part cold crosslinking emulsion compostion of the first embodiment]

[Example 1]

(a)

[Example 2]

(b)

low ← molecular weight → high

[One part cold crosslinking emulsion composition of the second embodiment]

[Example 3]

before storage after storage (a)

[Example 4]

before storage after storage (b)

low ← molecular weight → high

[One part cold crosslinking emulsion composition of the third embodiment]

[Example 5]

5,869,568

ONE-PART COLD CROSSLINKING EMULSION COMPOSITION AND METHOD OF MANUFACTURING THE SAME

BACKGROUND OF THE INVENTION

The present invention relates to a one-part cold crosslinking emulsion composition employed in the fields such as coatings, adhesives, fiber processing, civil engineering and the like and a method of manufacturing the same.

Since aqueous emulsions in general are superior in terms of safety and hygiene to solvent type resins, they are widely used in the fields such as coatings, adhesives, fiber processing, civil engineering and the like. However, films using aqueous emulsion have problems of inferiority in water resistance, permeability to base material, impregnation-reinforcing property, surface smoothness and the like to films using the solvent type resins. Hence, in order to improve such aqueous emulsions, a method has been proposed of enhancing permeability to base material and surface smoothness by lowering a molecular weight of polymers so as to produce fluidity and achieving good water resistance and impregnation-reinforcing property by crosslinking the polymers after film formation. For example, an aqueous emulsion has been proposed in which fine grains of a double structure (a core-shell structure), having a core part in which glycidyl group-containing monomers are polymerized and a shell layer in which carboxyl group-containing monomers are polymerized and a shell layer in which carboxyl group-containing monomers are polymerized, are contained in an aqueous medium and, after film formation, glycidyl groups and carboxyl groups are subjected to crosslinking reactions (Japanese Patent Publication No. 39025/88). In the meantime, another aqueous emulsion has been proposed in which amino group-containing monomers are used instead of the above-mentioned carboxyl group-containing monomers, and, after film formation, glycidyl groups and amino groups are subjected to crosslinking reactions (Japanese Provisional Patent Publication No. 73308/94).

Regarding the above-described aqeuous emulsions, however, there is a fear that crosslinking functional groups (glycidyl groups, carboxyl group and the like) existing inside the fine grains will crosslink each other at storage. In particular, such tendency is prominent in case of storage under a high temperature. For this reason, the molecular weight of the fine grains increases during the storage of the aqueous emulsions and fluidity deteriorates. As a result, films using such aqueous emulsions have disadvantages of poor permeability to base material and surface smoothness.

It is an object of the present invention to provide a one-part cold crosslinking emulsion composition which exhibits excellent storage stability with maintaining good crosslinking property and a method of manufacturing the same.

SUMMARY OF THE INVENTION

It is a first aspect of the present invention to provide a one-part cold crosslinking emulsion composition containing, in an aqueous medium, a double-structure fine grain comprising the following Component (A) and the following Component (B) covering Component (A), wherein the following Component (C) is contained in at least one of Components (A) and (B):

(A) a copolymer comprising an epoxy group-containing monomer and an ethylenic unsaturated monomer,
(B) a copolymer comprising an unsaturated carboxylic acid and an ethylenic unsaturated monomer, and
(C) a low molecular weight monofunctional epoxy compound.

It is a second aspect of the present invention to provide a method of manufacturing a one-part cold crosslinking emulsion composition comprising steps of preparing a fine grain containing the above-mentioned Component (A) in an aqueous medium, and covering a periphery of the fine grain made of Component (A) with the above-mentioned Component (B) so as to prepare a double-structure fine grain, wherein the method further comprises a step of mixing the above-mentioned Component (C) with at least one of Components (A) and (B).

Namely, the inventors of the present invention compiled studies on storage stability of an emulsion composition containing, in an aqueous medium, a double-structure fine grain comprising Component (A) 11 and Component (B) 12 covering Component (A), as shown in FIG. 8. During a series of the studies, the inventors found that carboxyl groups of Component (B) 12 in fact are distributed from around a surface 13 of the fine grain to around the surface 13 of the fine grain. As a result, as shown in FIG. 9 (showing a chemical reaction in a schematic way), they perceived that, during storage of the above emulsion composition, the carboxyl groups around the interface 14 between Components (A) 11 and (B) 12 react with epoxy groups in Component (A) 11 so as to form three-dimensional network structures around the interface 14 between Components (A) 11 and (B), which thereby rapidly increases a molecular weight. The inventors then found that, to obtain good storage stability, it needs to reduce the number of the carboxyl groups around the interface 14 between Components (A) 11 and (B) 12 and to localize the carboxyl groups around the surface 13 of the fine grain. Consequently, the inventors reached the present invention when they found that low molecular weight monofunctional epoxy compounds (Component (C)) anticipatorily react with the carboxyl groups around the interface 14 between Components (A) 11 and (B) 12 by mixing Component (C) with at least one of Components (A) 11 and (B) 12, as shown in FIG. 10 (showing the chemical reaction in a schematic way), and a molecular weight hardly increases since Component (C) has low molecular weight and is monofunctional. Accordingly, since the carboxyl groups around the interface 14 between Components (A) 11 and (B) 12 are reduced in number to avoid the formation of three-dimensional network structures, rapid increase of the molecular weight may be restrained.

DETAILED DESCRIPTION OF THE INVENTION

One-part cold crosslinking emulsion compositions according to the present invention may roughly be divided into three embodiments. As shown in FIG. 1, a one-part cold crosslinking emulsion composition of the first embodiment is made up so that an aqueous medium contains a double-structure fine grain in which Component (A) 1 is covered with Component (B) 2, and a low molecular weight monofunctional epoxy compound (Component (C)) (shown as a compound having a functional group R at one end of an epoxy group) is contained in Component (B) 2. As shown in FIG. 2, a one-part cold crosslinking emulsion composition of the second embodiment is made up so that the low molecular weight monofunctional epoxy compound (Component (C)) is contained in Component (A) 1. As shown in FIG. 3, a one-part cold crosslinking emulsion composition of the third embodiment is made up so that the low molecular weight monofunctional epoxy compound (Component (C)) is contained in both of Components (A) 1 and (B) 2.

The one-part cold crosslinking emulsion composition according to the present invention, shown in the three embodiments, may be obtained by employing an aqueous medium which is a dispersible medium, a copolymer comprising an epoxy group-containing monomer and an ethylenic unsaturated monomer (Component (A)), a copolymer comprising an unsaturated carboxylic acid and an ethylenic unsaturated monomer (Component (B)), and a low molecular weight monofunctional epoxy compound (Component (C)).

As the aqueous media used for the one-part cold crosslinking emulsion compositions according to the present invention, water is most suitable. However, an easily-soluble organic solvent may be used together with water in an attempt to enhance permeability to base material. Examples of organic solvents include isopropyl alcohol, methanol, ethanol, propanol, acetone, methyl ethyl ketone, dioxane, ethylene glycol, propylene glycol, glycerin, methyl carbitol, ethyl carbitol, butyl carbitol, methyl cellosolve, ethyl cellosolve, acetic acid, acetates of the above alcohols, acetates of the above carbitols, acetates of the above cellosolves and the like. When using such organic solvents, from the viewpoint of safety of the one-part cold crosslinking emulsion composition, the organic solvent is used in the range of, preferably not more than 50% by weight (hereinafter, abbreviated to "%") of the total medium, more preferably not more than 20%.

The epoxy group-containing monomers for the above Component (A) may be glycidyl acrylate, glycidyl methacrylate (GMA) and the like. They are used solely or in combination.

The ethylenic unsaturated monomer used together with the epoxy group-containing monomer may be a monomer which is used for usual emulsion polymerization. For example, there may be hydrophobic monomers such as styrene, alkyl ester acrylate, alkyl ester methacrylate, vinyl acetate, acrylonitrile, methacrylonitrile and the like. They are used solely or in combination.

The unsaturated carboxylic acids for Component (B) may include acrylic acid, methacrylic acid, maleic acid, itaconic acid, fumaric acid, crotonic acid and the like. They are used solely or in combination.

The ethylenic unsaturated monomer used together with the unsaturated carboxylic acid, the same examples for Component (A) may be used.

A mixing ratio of Component (B) is preferably determined in the range from 25 to 400 parts by weight (hereinafter, abbreviated to "part") based on 100 parts of Component (A), more preferably in the range from 66.7 to 150 parts.

Component (C) which is contained in at least one of Components (A) and (B) may be a low molecular weight monofunctional epoxy compound. According to the present invention, a low molecular weight used in the low molecular weight monofunctional epoxy compound (Component (C)) means a number average molecular weight of 58 to 350, preferably 100 to 200. Namely, if the number average molecular weight of Component (C) is below 58, hydrophilic property of Component (C) becomes strong and Component (C) is apt to exist in an aqueous phase, whereby Component (C) is apt to react with carboxyl groups around the surface of a fine grain. On the other hand, if the number average molecular weight of Component (C) exceeds 350, the movement of Component (C) inside the fine grain becomes slower than the movement of GMA and the like existing inside the fine grain, whereby reaction between Component (C) and the carboxyl groups around the interface between Components (A) and (B) becomes insufficient.

The low molecular weight monofunctional epoxy compound described above may be represented by the following general formula (1).

wherein R represents a functional group.

The functional groups R in the above general formula (1) include, for example, an alkyl group, a phenyl group, an ethylene oxide group, a propylene oxide group and the like.

For the low molecular weight monofunctional epoxy compounds (Component (C)), specifically, it is in particular preferable to use an epoxy compound represented by the following general formula (2) (Denacol EX-121, $C_{10}H_{20}O_2$ (a molecular weight of 172), manufactured by Nagase Chemicals Limited).

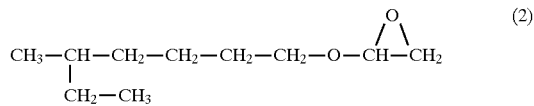

With respect to a mixing ratio of the low molecular weight monofunctional epoxy compound (Component (C)) with the unsaturated carboxylic acid in Component (B), a molar ratio of unsaturated carboxylic acid/Component (C) is preferably set in the range from 0.1 to 5.0. A more preferable molar ratio of unsaturated carboxylic acid/Component (C) is in the range from 4.0 to 4.7. Namely, if the molar ratio is below 0.5, there is a fear that the proportion of Component (C) becomes too much so that Component (C) also reacts with the carboxyl groups around the surface of the fine grain of Component (B). On the other hand, if the molar ratio exceeds 5.0, the proportion of Component (C) becomes so low that there is seen a tendency that Component (C) does not sufficiently react with the carboxyl groups around the interface between Components (A) and (B).

In the one-part cold crosslinking emulsion composition according to the present invention, in addition to the aqueous medium and Components (A), (B) and (C), water which is used to dilute thereof, a chain transfer agent, an emulsifier and a polymerization initiator may appropriately be added. If desired, additives used for ordinary coatings such as plasticizer, filler, pigment, dispersing agent, thickener, solvent, antifoaming agent, antiseptic and the like may appropriately be added.

Specific examples of the chain transfer agents may be alkyl mercaptans having chain transfer effects, long-chain alkyl mercaptans, a thiol group-containing oxide, aromatic mercaptans, alcohols, halogenated hydrocarbons and the like.

The emulsifiers are not limited as long as they are to be used in emulsion polymerization. For example, they may be ordinary emulsifiers such as sodium alkylsulfate, sodium alkylbenzenesulfonate, sodium alkylsulfosuccinate, sodium alkylethersulfate, polyoxyethylene alkyl ether, polyoxyethylene alkyl phenol ether and the like.

The polymerization initiators are not limited as long as they are used in copolymerization. For example, benzoyl peroxide, azobisisobutyronitrile, 2,2'-azobisaminodipropane hydrochloride, ammonium peroxide, potassium peroxide and the like may be used.

Method of manufacturing one-part cold crosslinking emulsion compositions according to the present invention shown in the first, second and third embodiments will hereinafter be described. First, a one-part cold crosslinking emulsion composition of the first embodiment shown in FIG. 1 may be manufactured, for example, in the following manner. That is, an aqueous solution of a polymerization initiator is dropwise added to a mixture of an aqueous medium and a surfactan over the course of several hours, while an emulsifying liquid containing the forming material of Component (A), that is, an epoxy group-containing monomer and an ethylenic unsaturated monomer, and further a chain transfer agent and the like is dropwise added thereto over the course of several hours so as to complete a maturing reaction. A fine grain made of a copolymer (Component (A)) 1 of the epoxy group-containing monomer and the ethylenic unsaturated monomer is prepared. Thereafter, an emulsifying liquid containing the forming material of Component (B), that is, an unsaturated carboxyl acid and an ethylenic unsaturated monomer, a low molecular weight monofunctional epoxy compound (Component (C)) and further a chain transfer agent and the like is dropwise added to the fine grain thus obtained over the course of several hours so as to complete a maturing reaction. As a result, a periphery of the fine grain made of Component (A) 1 is covered with a fine grain in which the low molecular weight monofunctional epoxy compound (Component (C)) has reacted with the copolymer (Component (B)) 2 of the unsaturated carboxyl acid and the ethylenic unsaturated monomer so as to prepare a double-structure fine grain. After the fine grain thus obtained is cooled, an aqueous ammonia is added thereto.

In this way, the one-part cold crosslinking emulsion composition of the first embodiment shown in FIG. 1 may be obtained. FIG. 1 is a schematic view showing the structure of the above-described double-structure fine grain before storage, and FIG. 4 is a schematic view showing the structure of the above-described double-structure fine grain after storage. As shown in FIG. 1, in the double-structure fine grain before storage, the low molecular weight monofunctional epoxy compound (Component (C)) (in the figure, shown as a compound having a functional group R at one end of an epoxy group) has reacted with Component (B) 2. Meanwhile, as shown in FIG. 10, in the double-structure fine grain after storage, the low molecular weight monofunctional epoxy compounds which exist inside Component (B) 2 anticipatorily react with carboxyl groups around an interface 4 between Components (A) 1 and (B) 2, whereby reducing the number of carboxyl groups around the interface 4. As a result, as shown in FIG. 4, the carboxyl groups are localized around a surface 3 of the fine grain of Component (B) 2. Consequently, since the carboxyl groups around the interface 4 are reduced in number and the formation of a three-dimensional network structure shown in FIG. 9 is prevented, rapid increase in molecular weight may be restrained.

A one-part cold crosslinking emulsion composition of the second embodiment shown in FIG. 2 may be manufactured, for example, in the following manner. That is, an aqueous solution of a polymerization initiator is dropwise added to a mixture of an aqueous medium and a surfactant over the course of several hours, while an emulsifying liquid containing the forming material of Component (A), that is, an epoxy group-containing monomer and an ethylenic unsaturated monomer, a low molecular weight monofunctional epoxy compound (Component (C)) and further a chain transfer agent and the like is added dropwise thereto for reaction over the course of several hours so as to complete a maturing reaction. A fine grain in which the low molecular weight monofunctional epoxy compound (Component (C)) has reacted with a copolymer (Component (A)) 1 of the epoxy group-containing monomer thus is prepared. Thereafter, an emulsifying liquid containing the forming material of Component (B), that is, an unsaturated carboxylic acid and an ethylenic unsaturated monomer, further a chain transfer agent and the like is dropwise added to the fine grain thus obtained over the course of several hours so as to complete a maturing reaction. As a result, a periphery of the fine grain in which the low molecular weight monofunctional epoxy compound (Component (C)) has reacted with Component (A) 1 is covered with a copolymer (Component (B)) 2 of the unsaturated carboxyl acid and the ethylenic unsaturated monomer so as to prepare a double-structure fine grain. After the fine grain thus obtained is cooled, an aqueous ammonia is added thereto.

In this way, the one-part cold crosslinking emulsion composition of the second embodiment shown in FIG. 2 may be obtained. As in the one-part cold crosslinking emulsion composition of the first embodiment, in the one-part cold crosslinking emulsion composition of the second embodiment after storage, carboxyl groups around an interface 4 between Components (A) 1 and (B) 2 are reduced in number and the carboxyl groups are localized around a fine grain's surface 3, as shown in FIG. 4.

A one-part cold crosslinking emulsion composition of the third embodiment shown in FIG. 3 may be manufactured, for example, in the following manner. That is, an aqueous solution of a polymerization initiator is dropwise added to a mixture of an aqueous medium and a surfactant over the course of several hours, while an emulsifying liquid containing the forming material of Component (A), that is, an epoxy group-containing monomer and an ethylenic unsaturated monomer, a low molecular weight monofunctional epoxy compound (Component (C)) and further a chain transfer agent and the like is dropwise added thereto over the course of several hours so as to complete a maturing reaction. A fine grain in which the low molecular weight monofunctional epoxy compound (Component (C)) has reacted with a copolymer (Component (A)) 1 of the epoxy group-containing monomer and the ethylenic unsaturated monomer thus is prepared. Thereafter, an emulsifying liquid containing the forming material of Component (B), that is, an unsaturated carboxylic acid and an ethylenic unsaturated monomer, a low molecular weight monofunctional epoxy compound (Component (C)) and further a chain transfer agent and the like is dropwise added to the fine grain thus obtained for reaction over the course of several hours so as to complete a maturing reaction. As a result, a periphery of the fine grain in which the low molecular weight monofunctional epoxy compound (Component (C)) has reacted with Component (A) 1 is covered with a fine grain in which the low molecular weight monofunctional epoxy compound (Component (C)) has reacted with a copolymer (Component (B)) 2 of the unsaturated carboxyl acid and the ethylenic unsaturated monomer so as to prepare a double-structure fine grain. After the fine grain thus obtained is cooled, an aqueous ammonia is added thereto.

In this way, the one-part cold crosslinking emulsion composition of the third embodiment shown in FIG. 3 may be obtained. As in the one-part cold crosslinking emulsion composition of the first embodiment, in the one-part cold crosslinking emulsion composition of the third embodiment after storage, carboxyl groups around an interface 4 between Components (A) 1 and (B) 2 are reduced in number and the carboxyl groups are localized around a fine grain's surface 3, as shown in FIG. 4.

The one-part cold crosslinking emulsion compositions thus obtained according to the present invention may be coated as reinforcing material for any base materials, for example, inorganic building materials such as concrete, slates, calcium silicate boards, autoclaved lightweight concrete (ALC) boards and the like, metal, lumber, paper, fabrics, glass, synthetic resins, pottery, leather and the like, and they exhibit excellent water resistance, impregnation-reinforcing property, surface smoothness and adhesion.

The present invention will hereinafter be explained by reference to Examples and Comparative Examples.

EXAMPLE 1

This example describes the one-part cold crosslinking emulsion composition of the first embodiment.

70 parts of water and 1 part of Levenol WZ (a surfactant, manufactured by Kao Corporation) were added to a four neck flask equipped with a mixing blade, a thermometer and a reflux condenser. The mixture was then heated so that its inside temperature was 70° C. Under these conditions, an aqueous solution of a polymerization initiator (in which 0.3 part of potassium peroxide was dissolved in 10 parts of water) was dropwise added thereto over the course of five hours while an emulsifying liquid A, shown in Table 1 below, containing the forming material of Component (A), a chain transfer agent and the like was dropwise added over the course of two hours so as to complete 0.5 hour of a maturing reaction. Subsequently, an emulsifying liquid B, shown in Table 1 below, containing the forming material of Component (B), a low molecular weight monofunctional epoxy compound (Component (C)), a chain transfer agent and the like was dropwise added over the course of two hours so as to complete 2 hours of a maturing reaction. After the resultant produce was cooled, 0.25 part of aqueous ammonia was added thereto. Thus, the targeted one-part cold crosslinking emulsion composition (50% concentration of a solid portion) of the first embodiment was obtained. In the meantime, molar amounts of the low molecular weight monofunctional epoxy compound (Component (C)) and the methacrylic acid were $0.29 \times 10^{-2}$ mole and $1.16 \times 10^{-2}$ mole, respectively, and a molar ratio of methacrylic acid/Component (C) was 4.0.

EXAMPLE 2

Emulsifying liquids A' and B' at the mixing ratios shown in the following Table 1 were used. Except those changes, the same procedure as that of Example 1 was repeated to prepare a one-part cold crosslinking emulsion composition (50% concentration of a solid portion) of the first embodiment. In the meantime, molar amounts of the low molecular weight monofunctional epoxy compound (Component (C)) and the methacrylic acid were $2.32 \times 10^{-2}$ mole and $1.16 \times 10^{-2}$ mole, respectively, and a molar ratio of methacrylic acid/Component (C) was 0.5.

EXAMPLE 3

This example describes a one-part cold crosslinking emulsion composition of the second embodiment.

An emulsifying liquid C (containing a low molecular weight monofunctional epoxy compound (Component (C))) shown in the following Table 1 was used instead of the emulsifying liquid A of Example 1, and an emulsifying liquid D (not containing the low molecular weight monofunctional epoxy compound (Component (C))) shown in the following Table 1 was used instead of the emulsifying liquid B of Example 1. Except those changes, the same procedure as that of Example 1 was repeated to prepare a one-part cold crosslinking emulsion composition (50% concentration of a solid portion) of the second embodiment. In the meantime, molar amounts of the low molecular weight monofunctional epoxy compound (Component (C)) and the methacrylic acid were $0.29 \times 10^{-2}$ mole and $1.16 \times 10^{-2}$ mole, respectively, and a molar ratio of methacrylic acid/Component (C) was 4.0.

EXAMPLE 4

Emulsifying liquid C' and D' at the mixing ratios shown in the following Table 1 were used. Except those changes, the same procedure as that of Example 3 was repeated to prepare a one-part cold crosslinking emulsion compositions (50% concentration of a solid portion) of the second embodiment.

In the meantime, molar amounts of the low molecular weight monofunctional epoxy compound (Component (C)) and the methacrylic acid were $0.23 \times 10^{-2}$ mole and $1.16 \times 10^{-2}$ mole, respectively, and a molar ratio of methacrylic acid/Component (C) was 5.0.

EXAMPLE 5

This example describes a one-part cold crosslinking emulsion composition of the third embodiment.

Emulsifying liquids A" and B" at the mixing ratios shown in the following Table 2 were used. Except those changes, the same procedure as that of Example 1 was repeated to prepare a one-part cold crosslinking emulsion compositions (50% concentration of a solid portion) of the third embodiment.

In the meantime, molar amounts of the low molecular weight monofunctional epoxy compound (Component (C)) and the methacrylic acid were $0.29 \times 10^{-2}$ mole and $1.16 \times 10^{-2}$ mole, respectively, and a molar ratio of methacrylic acid/Component (C) was 4.0.

Comparative Example 1

Instead of the emulsifying liquid B of Example 1, an emulsifying liquid D (not containing a low molecular weight monofunctional epoxy compound (Component (C))) shown in the following Table 2 was used. Except that change, the same procedure as that of Example 1 was repeated to prepare an emulsion composition (50% concentration of a solid portion).

Comparative Example 2

Instead of the emulsifying liquid A of Comparative Example 1, an emulsifying liquid E (not containing GMA) shown in the following Table 2 was used. Except that change, the same procedure as that of Comparative Example 1 was repeated to prepare an emulsion composition (50% concentration of a solid portion).

TABLE 1

① Gloss coatings (parts)

| | Examples | | | | | | | |
|---|---|---|---|---|---|---|---|---|
| | 1 | | 2 | | 3 | | 4 | |
| | Kind of emulsifying liquids | | | | | | | |
| | A | B | A' | B' | C | D | C' | D' |
| Styrene | 15 | 15 | 15 | 15 | 15 | 15 | 15 | 15 |
| Methyl methacrylate | 18.5 | 19 | 18.5 | 19 | 18.5 | 19 | 18.5 | 19 |
| 2-ethylhexyl acrylate | 14 | 15 | 14 | 15 | 14 | 15 | 14 | 15 |
| Glycidyl methacrylate (GMA) | 2.5 | — | 2.5 | — | 2.5 | — | 2.5 | — |
| Epoxy compound * | — | 0.5 | — | 4 | 0.5 | — | 0.4 | — |
| Methacrylic acid | — | 1 | — | 1 | — | 1 | — | 1 |
| n-dodecylmercaptan (Chain transfer agent) | 0.25 | 1 | 0.25 | 1 | 0.25 | 1 | 0.25 | 1 |
| Emulgen 950 (manufactured by Kao Corporation) | 1 | 1 | 1 | 1 | 1 | 1 | 1 | 1 |
| Water | 14 | 14 | 14 | 14 | 14 | 14 | 14 | 14 |

*: a low molecular weight monofunctional epoxy compound (Denacol EX-121 having a molecular weight of 172, manufactured by Nagase Chemicals Limited.)

TABLE 2

① Gloss coatings (parts)

| | Example | Comparative Examples | |
|---|---|---|---|
| | 5 | 1 | 2 |
| | Kind of emulsifying liquids | | |
| | A" | B" | A | D | E | D |
| Styrene | 15 | 15 | 15 | 15 | 15 | 15 |
| Methyl methacrylate | 18.5 | 19 | 18.5 | 19 | 20 | 19 |
| 2-ethylhexyl acrylate | 14 | 15 | 14 | 15 | 15 | 15 |
| Glycidyl methacrylate (GMA) | 2.5 | — | 2.5 | — | — | — |
| Epoxy compound * | 0.25 | 0.25 | — | — | — | — |
| Methacrylic acid | — | 1 | — | 1 | — | 1 |
| n-dodecylmercaptan (Chain transfer agent) | 0.25 | 1 | 0.25 | 1 | 0.25 | 1 |
| Emulgen 950 (manufactured by Kao Corporation) | 1 | 1 | 1 | 1 | 1 | 1 |
| Water | 14 | 14 | 14 | 14 | 14 | 14 |

*: a low molecular weight monofunctional epoxy compound (Denacol EX-121 having a molecular weight of 172, manufactured by Nagase Chemicals Limited.)

The emulsion compositions of Examples 1–5 and Comparative Example 1 thus obtained were evaluated in terms of storage stability and crosslinking property according to the following basis.

Storage Stability

The emulsion compositions of Examples 1–5 and Comparative Example 1 before storage and after storage (at 40° C. for one month) were measured in terms of molecular weight distribution by gel permeation chromatography (GPC) (solvent: THF). The molecular weight distributions of the emulsion compositions of Examples 1–5 before and after storage are shown in the charts of FIGS. 5–7.

From the results of the storage stability test, the emulsion compositions of Examples 1–5 were soluble in the THF because crosslinking reactions did not proceed at storage in each Example. Besides, from the charts in FIGS. 5–7, it was confirmed that there was a small change in the molecular weight distribution in each emulsion composition of Examples 1–5, and, in particular, the changes in the molecular weight distributions for the emulsion compositions of Examples 1 and 2 were smaller than those of the emulsion compositions of Examples 3 and 4. It is considered that this happens because, in the emulsion compositions of Examples 3 and 4, a reaction (a conventional reaction) between the epoxy groups in Component (A) and the carboxyl groups around an interface between Components (A) and (B) takes place in addition to a reaction (a reaction of the present invention) between the low molecular weight monofunctional epoxy compounds (Component (C)) and the carboxyl groups around the interface, and therefore a reaction amount of the present invention is reduced due to the competition between both of the reactions, compared with Examples 1 and 2. Hence, it is known that it is more preferable to contain the low molecular weight monofunctional composition (Component (C)) in Component (B) than in Component (A). On the other hand, the emulsion composition of Comparative Example 1 became insoluble in the THF after one month and in terms of molecular weight since crosslinking reactions proceeded at storage.

Crosslinking Property

The emulsion compositions of Examples 1–5 and Comparative Example 1 were plasticized in advance by a film forming assistant (CS-12, manufactured by Chisso Corporation), and were then applied on polyethylene plates and dried at room temperature for one day to form films. The films thus obtained were refluxed at 60° C. for three hours so as to measure acetone insoluble contents therein. The results are shown in Table 3 below.

TABLE 3

| | Examples | | | | | Comparative Example |
|---|---|---|---|---|---|---|
| | 1 | 2 | 3 | 4 | 5 | 1 |
| Acetone insoluble content (%) | 1.7 | 3.0 | 7.9 | 4.0 | 3.5 | 3.4 |

From the results shown in Table 3, the following are known. The emulsion compositions of Examples 1–5 have little differences in the acetone insoluble contents compared with the emulsion composition of Comparative Example 1, and the emulsion compositions of Examples 1–5 maintain almost the same good crosslinking property as that of the emulsion composition of Comparative Example 1.

From the results of the evaluations on storage stability and crosslinking property, it is known that the emulsion compositions of Examples 1–5 maintain almost the same good crosslinking property as that of the emulsion composition of Comparative Example 1 and yet exhibit more markedly excellent storage stability than the emulsion composition of Comparative Example 1.

to form samples. The samples were dried at room temperature for three days and measured in terms of 60° and 20° gloss.

Water Resistance Test

After the above samples were soaked in water (20° C.) for three days, blistering of the films were observed. As a result, the films without blistering were evaluated as ○, the films with some blistering were evaluated as Δ, and the films with a lot of blistering were evaluated as X.

TABLE 6

|  | Examples | | | | | | | |
|---|---|---|---|---|---|---|---|---|
|  | 1 | | 2 | | 3 | | 4 | |
|  | before storage | after storage | before storage | after storage | before storage | after storage | before storage | after storage |
| 60° gloss | 90 | 90 | 90 | 90 | 90 | 85 | 90 | 85 |
| 20° gloss | 80 | 80 | 80 | 80 | 80 | 75 | 80 | 75 |
| Water resistance | ○ | ○ | ○ | ○ | ○ | ○ | ○ | ○ |

Next, Examples in which one-part cold crosslinking emulsion compositions according to the present invention are used for various applications will be described by reference to Comparative Examples.

Gloss Coatings

Coatings were prepared by using the emulsion compositions of Examples 1–4 and Comparative Examples 1 and 2 before storage and after storage at 40° C. for one month at the mixing ratios shown in Tables 4 and 5 below.

TABLE 4

|  | (parts) |
|---|---|
| Emulsion composition | 100 |
| Mill base (see Table 5) | 33.1 |
| SN-Defoamer 305 (manufactured by Sannopco Limited) | 0.5 |
| Filmforming assistant | 4.0 |
| (CS12, manufactured by Chisso Corporation) |  |
| YODOSOL KA-10 (manufactured by NIPPON NSC Ltd.) | 0.8 |

TABLE 5

[Mixing ratio of mill base]

|  | (parts) |
|---|---|
| Aqueous solution of 4% HEC SP600 | 5 |
| (manufactured by Daicel Chemical Industries Limited |  |
| Water | 1.2 |
| Ethylene glycol | 0.6 |
| Aqueous solution of 4% potassium tripolyphosphate | 2.5 |
| Orotan 731SD (manufactured by Roam and Haas Japan K.K.) | 0.2 |
| SN-Defoamer 305 (manufactured by Sannopco Limited) | 0.3 |
| Moulnon 3900 (manufactured by Katayama Chemical, Inc) | 0.3 |
| Titanium oxide R630 | 23 |
| (manufactured by Ishihara Sangyo Kaisha, Ltd.) |  |

A gloss test and a water resistance test according to the following basis were conducted on the resultant coatings of the emulsion composition of Examples 1–4 and Comparative Examples 1 and 2 (before and after storage) according to the following basis. The results are shown in Tables 6 and 7.

Gloss Test

The above-described coatings of the emulsion compositions were applied on glass boards with a 10-mil applicator

TABLE 7

|  | Comparative Examples | | | |
|---|---|---|---|---|
|  | 1 | | 2 | |
|  | before storage | after storage | before storage | after storage |
| 60° gloss | 90 | 80 | 90 | 90 |
| 20° gloss | 80 | 55 | 80 | 80 |
| Water resistance | ○ | ○ | X | X |

From the results shown in Table 6, the following are known. The emulsion compositions of Examples 1 and 2 before and after storage are excellent in both gloss and water resistance. The emulsion compositions of Examples 3 and 4 before and after storage are excellent in water resistance. After storage, however, they are decreased in gloss and are a little inferior in stability to the emulsion compositions of Examples 1 and 2. In the meantime, from the results shown in Table 7, the following are known. The emulsion composition of Comparative Example 1 is decreased in gloss due to the deterioration in smoothness of the surface of a paint film after storage. The emulsion composition of Comparative Example 2 before and after storage exhibits inferior water resistance since the emulsion composition neither contains GMA nor crosslinks.

EXAMPLE 6

This example describes a one-part crosslinking emulsion composition of the first embodiment.

70 parts of water and 1 part of Levenol WZ (a surfactant, manufactured by Kao Corporation) were added to a four neck flask equipped with a mixing blade, a thermometer and a reflux condenser. The mixture was then heated so that its inside temperature was 70° C. With this condition, an aqueous solution of a polymerization initiator (in which 0.3 part of potassium peroxide was dissolved in 10 parts of water) was dropwise added thereto over the course of five hours while an emulsifying liquid F, shown in Table 8 below, containing the forming material of Component (A), a chain transfer agent and the like dropwise added over the course of two hours so as to complete 0.5 hour of a maturing reaction. Subsequently, an emulsifying liquid G, shown in Table 8 below, containing the forming material of Component (B), a low molecular weight monofunctional epoxy compound (Component (C)), a chain transfer agent and the like was dropwise added over the course of two hours so as to complete 2 hours of a maturing reaction. After the resultant product was cooled, 1 part of aqueous ammonia was added thereto. Thus, the targeted one-part cold crosslinking emulsion composition (50% concentration of a solid portion) of the first embodiment was obtained. In the meantime, molar amounts of the low molecular weight monofunctional epoxy compound (Component (C)) and the acrylic acid were $0.58 \times 10^{-2}$ mole and $2.70 \times 10^{-2}$ mole, respectively, and a molar ratio of acrylic acid/Component (C) was 4.7.

EXAMPLE 7

Emulsifying liquids F' and G' at the mixing ratios shown in the following Table 8 were used. Except those changes, the same procedure as that of Example 6 was repeated to prepare a one-part cold crosslinking emulsion composition (50% concentration of a solid portion) of the first embodiment. In the meantime, molar amounts of the low molecular weight monofunctional epoxy compound (Component (C)) and the acrylic acid were $5.4 \times 10^{-2}$ mole and $2.70 \times 10^{-2}$ mole, respectively, and a molar ratio of acrylic acid/Component (C) was 0.5.

EXAMPLE 8

This example describes a one-part cold crosslinking emulsion composition of the second embodiment.

An emulsifying liquid H (containing a low molecular weight monofunctional epoxy compound (Component (C))) shown in the following Table 8 was used instead of the emulsifying liquid F of Example 6, and an emulsifying liquid I (not containing the low molecular weight monofunctional epoxy compound (Component (C))) shown in the following Table 8 was used instead of the emulsifying liquid G of Example 6. Except those changes, the same procedure as that of Example 6 was repeated to prepare a one-part cold crosslinking emulsion composition (50% concentration of a solid portion) of the second embodiment. In the meantime, molar amounts of the low molecular weight monofunctional epoxy compound (Component (C)) and the acrylic acid were $0.58 \times 10^{-2}$ mole and $2.70 \times 10^{-2}$ mole, respectively, and a molar ratio of acrylic acid/Component (C) was 4.7.

EXAMPLE 9

Emulsifying liquids H' and I' at the mixing ratios shown in the following Table 8 were used. Except those changes, the same procedure as that of Example 8 was repeated to prepare a one-part cold crosslinking emulsion composition (50% concentration of a solid portion) of the second embodiment. In the meantime, molar amounts of the low molecular weight monofunctional epoxy compound (Component (C)) and the acrylic acid were $0.54 \times 10^{-2}$ mole and $2.70 \times 10^{-2}$ mole, respectively, and a molar ratio of acrylic acid/Component (C) was 5.0.

Comparative Example 3

Instead of the emulsifying liquid G of Example 6, an emulsifying liquid J (not containing a low molecular weight monofunctional epoxy compound (Component (C))) shown in the following Table 9 was used. Except that change, the same procedure as that of Example 6 was repeated to prepare an emulsion composition (50% concentration of a solid portion).

Comparative Example 4

Instead of emulsifying liquid F of Comparative Example 3, an emulsifying liquid K (not containing GMA) shown in the following table 9 was used. Except that change, the same procedure as that of Comparative Example 3 was repeated to prepare an emulsion composition (50% concentration of a solid portion).

TABLE 8

② Sealers for inorganic building materials (parts)

| | Examples | | | | | | | |
|---|---|---|---|---|---|---|---|---|
| | 6 | | 7 | | 8 | | 9 | |
| | Kind of emulsifying liquids | | | | | | | |
| | F | G | F' | G' | H | I | H' | I' |
| Styrene | 10 | 10 | 10 | 10 | 10 | 10 | 10 | 10 |
| Methyl methacrylate | 20 | 20 | 20 | 20 | 20 | 20 | 20 | 20 |
| Butyl acrylate | 17 | 17 | 17 | 17 | 17 | 17 | 17 | 17 |
| Glycidyl methacrylate (GMA) | 3 | — | 3 | — | 3 | — | 3 | — |
| Epoxy compound * | — | 1 | — | 9.3 | 1 | — | 0.93 | — |
| Acrylic acid | — | 2 | — | 2 | — | 2 | — | 2 |
| n-dodecylmercaptan (chain transfer agent) | 1 | 1 | 1 | 1 | 1 | 1 | 1 | 1 |
| Emulgen 950 (manufactured by Kao Corporation) | 1 | 1 | 1 | 1 | 1 | 1 | 1 | 1 |
| Water | 14 | 14 | 14 | 14 | 14 | 14 | 14 | 14 |

*: a low molecular weight monofunctional epoxy compound (Denacol EX-121 having a molecular weight of 172, manufactured by Nagase Chemicals Limited.)

TABLE 9

② Sealers for inorganic building materials (parts)

|  | Comparative Examples | | | |
|---|---|---|---|---|
|  | 3 | | 4 | |
|  | Kind of emulsifying liquids | | | |
|  | F | J | K | J |
| Styrene | 10 | 10 | 10 | 10 |
| Methyl methacrylate | 20 | 20 | 22 | 20 |
| Butyl acrylate | 17 | 17 | 18 | 17 |
| Glycidyl methacrylate (GMA) | 3 | — | — | — |
| Epoxy compound * | — | — | — | — |
| Acrylic acid | — | 2 | — | 2 |
| n-dodecylmercaptan (chain transfer agent) | 1 | 1 | 1 | 1 |
| Emulgen 950 (manufactured by Kao Corporation) | 1 | 1 | 1 | 1 |
| Water | 14 | 14 | 14 | 14 |

*: a low molecular weight monofunctional epoxy compound (Denacol EX-121 having a molecular weight of 172, manufactured by Nagase Chemicals Limited.)

Next, coatings were prepared by using the emulsion compositions of Examples 6–9 and Comparative Examples 3 and 4 before storage and after storage at 40° C. for one month at the mixing ratios shown in Table 10 below.

TABLE 10

|  | (parts) |
|---|---|
| Emulsion composition | 94.5 |
| Water | 60.4 |
| Primal 850 (manufactured by Roam and Haas Japan K.K.) | 2 |
| YODOSOL KA-10 (manufactured by NIPPON NSC Ltd.) | 0.5 |
| Titanium oxide R650 (manufactured by SAKAI CHEMICAL INDUSTRY CO., Ltd.) | 12.6 |
| CLAY ASP400P (manufactured by Engelhart Co., Ltd.) | 50 |
| Filmforming assistant (CS12, manufactured by Chisso Corporation) | 7 |

The resultant coatings of the emulsion compositions of Examples 6–9 and Comparative Examples 3 and 4 (before and after storage) were applied on commercially-available calcium silicate boards (0.7 g/cm³ specific gravity) with a brush at 120 g/cm² and dried at 120° C. for 5 minutes. Thereafter, the boards were cut in an appropriate size and evaluated in terms of adhesion, water resistance and warm water resistance according to the following basis. The results are shown in Tables 11 and 12 below.

Adhesion

A commercially-available cutter was used to make scars at a 4 mm interval on a paint film to form grids of 25 squares. A piece of cellophane tape was then strongly pressed thereon and peeled off rapidly. Thereafter, remaining squares on the paint film were counted (a cross cut test). Consequently, evaluation was conducted with ○ in which all the 25 squares remained, Δ in which remaining squares were 11 to 24, and X in which remaining squares were not more than 10.

Water Resistance

The above paint boards were cut at 10 cm×5 cm in size and soaked in water (20° C.) for one week, and thereafter were dried at 50° C. for 4 hours. Then, the same cross cut test as above was conducted.

Warm Water Resistance

The above paint boards were cut at 10 cm×5 cm in size and soaked in warm water (50° C.) for one week, and thereafter were dried at 50° C. for 4 hours. Then, the same cross cut test as above was conducted.

TABLE 11

|  | Examples | | | | | | | |
|---|---|---|---|---|---|---|---|---|
|  | 6 | | 7 | | 8 | | 9 | |
|  | before storage | after storage | before storage | after storage | before storage | after storage | before storage | after storage |
| Adhesion | ○ | ○ | ○ | ○ | ○ | Δ | ○ | Δ |
| Water resistance | ○ | ○ | ○ | ○ | ○ | Δ | ○ | Δ |
| Warm water resistance | ○ | ○ | ○ | ○ | ○ | Δ | ○ | Δ |

TABLE 12

|  | Comparative Examples | | | |
|---|---|---|---|---|
|  | 3 | | 4 | |
|  | before storage | after storage | before storage | after storage |
| Adhesion | ○ | X | X | X |
| Water resistance | ○ | X | X | X |
| Warm water resistance | ○ | X | X | X |

From the results shown in Table 11, the following are known. The emulsion compositions of Examples 6 and 7 before and after storage are excellent in all the evaluations in terms of adhesion, water resistance and warm water resistance. Regarding Examples 8 and 9, the evaluation results for the emulsion compositions after storage deteriorate compared to those before storage. Further, the emulsion compositions of Examples 8 and 9 are slightly inferior in stability to the emulsion compositions of Examples 6 and 7. In the meantime, from the results shown in Table 12, the following are known. The emulsion composition of Comparative Example 3 before storage is excellent in all the evaluations in terms of adhesion, water resistance and warm water resistance. However, after storage for one month, all the evaluation results deteriorate due to the deterioration of the permeability to base material. As to Comparative Example 4, since the emulsion composition neither contains GMA nor crosslinks it, before and after storage, is inferior in all the evaluations in terms of adhesion, water resistance and warm water resistance.

EXAMPLE 10

This example describes a one-part cold crosslinking emulsion composition of the first embodiment.

70 parts of water and 1 part of Levenol WZ (a surfactant, manufactured by Kao Corporation) were added to a four neck flask equipped with a mixing blade, a thermometer and a reflux condenser. The mixture was then heated so that its inside temperature was 70° C. Under these conditions, an aqueous solution of a polymerization initiator (in which 0.3 part of potassium peroxide was dissolved in 10 parts of water) was dropwise added thereto over the course of five hours while an emulsifying liquid L, shown in Table 13 below, containing the forming material of Component (A), a chain transfer agent and the like was dropwise added over the course of two hours so as to complete 0.5 hours of a maturing reaction. Subsequently, an emulsifying liquid M, shown in Table 13 below, containing the forming material of Component (B), a low molecular weight monofunctional epoxy compound (Component (C)), a chain transfer agent and the like was added dropwise over the course of two hours so as to complete 2 hours of a maturing reaction. After the resultant product was cooled, 1 part of aqueous ammonia was added thereto. Thus, the targeted one-part cold crosslinking emulsion composition (50% concentration of a solid portion) of the first embodiment was obtained. In the meantime, molar amounts of the low molecular weight monofunctional epoxy compound (Component (C)) and the acrylic acid were $0.58 \times 10^{-2}$ mole and $2.70 \times 10^{-2}$ mole, respectively, and a molar ratio of acrylic acid/Component (C) was 5.0.

EXAMPLE 12

This examples describes a one-part cold crosslinking emulsion composition of the second embodiment.

An emulsifying liquid N (containing a low molecular weight monofunctional epoxy compound (Component (C))) shown in the following Table 13 was used instead of the emulsifying liquid L of Example 10, and an emulsifying liquid O (not containing the low molecular weight monofunctional epoxy compound (Component (C))) shown in the following Table 13 was used instead of the emulsifying liquid M of Example 10. Except those changes, the same procedure as that of Example 10 was repeated to prepare a one-part cold crosslinking emulsion composition (50% concentration of a solid portion) of the second embodiment. In the meantime, molar amounts of the low molecular weight monofunctional epoxy compound (Component (C)) and the acrylic acid were $0.58 \times 10^{-2}$ mole, respectively, and a molar ratio of acrylic acid/Component (C) was 4.7.

EXAMPLE 13

Emulsifying liquids N' and O' at the mixing ratios shown in the following Table 13 were used. Except those changes, the same procedure as that of Example 12 was repeated to prepare a one-part cold crosslinking emulsion composition (50% concentration of a solid portion) of the second embodiment. In the meantime, molar amounts of the low molecular weight monofunctional epoxy compound (Component (C)) and the acrylic acid were $0.54 \times 10^{-2}$ mole, respectively, and a molar ratio of acrylic acid/Component (C) was 5.0.

Comparative Example 5

Instead of the emulsifying liquid M of Example 10, an emulsifying liquid P (not containing a low molecular weight monofunctional epoxy compound (Component (C))) shown in the following Table 14 was used. Except that change, the same procedure as that of Example 10 was repeated to prepare an emulsion composition (50% concentration of a solid portion).

Comparative Example 6

Instead of the emulsifying liquid L of Comparative Example 5, an emulsifying liquid Q (not containing GMA) shown in the following Table 14 was used. Except that change, the same procedure as that of Comparative Example 5 was repeated to prepare an emulsion composition (50% concentration of a solid portion).

TABLE 13

③ Coating agents for plastics (parts)

| | Examples | | | | | | | |
|---|---|---|---|---|---|---|---|---|
| | 10 | | 11 | | 12 | | 13 | |
| | Kind of emulsifying liquids | | | | | | | |
| | L | M | L' | M' | N | O | N' | O' |
| Styrene | 10 | 10 | 10 | 10 | 10 | 10 | 10 | 10 |
| Methyl methacrylate | 20 | 20 | 20 | 20 | 20 | 20 | 20 | 20 |
| Butyl acrylate | 17 | 17 | 17 | 17 | 17 | 17 | 17 | 17 |
| Glycidyl methacrylate (GMA) | 3 | — | 3 | — | 3 | — | 3 | — |
| Epoxy compound * | — | 1 | — | 9.3 | 1 | — | 0.93 | — |
| Acrylic acid | — | 2 | — | 2 | — | 2 | — | 2 |
| Emulgen 950 (manufactured by Kao corporation) | 1 | 1 | 1 | 1 | 1 | 1 | 1 | 1 |
| Water | 14 | 14 | 14 | 14 | 14 | 14 | 14 | 14 |

*: a low molecular weight monofunctional epoxy compound (Denacol EX-121 having a molecular weight of 172, manufactured by Nagase Chemicals Limited.)

TABLE 14

③ Coating agents for plastics
(parts)

|  | Comparative Examples | | | |
|---|---|---|---|---|
|  | 5 | | 6 | |
|  | Kind of emulsifying liquids | | | |
|  | L | P | O | P |
| Styrene | 10 | 10 | 10 | 10 |
| Methyl methacrylate | 20 | 20 | 22 | 20 |
| Butyl acrylate | 17 | 17 | 18 | 17 |
| Glycidyl methacrylate (GMA) | 3 | — | — | — |
| Epoxy compound * | — | — | — | — |
| Acrylic acid | — | 2 | — | 2 |
| Emulgen 950 (manufactured by Kao Corporation) | 1 | 1 | 1 | 1 |
| Water | 14 | 14 | 14 | 14 |

*: a low molecular weight monofunctional epoxy compound (Denacol EX-121 having a molecular weight of 172, manufactured by Nagase Chemicals Limited.)

The resultant emulsion compositions of Examples 10–13 and Comparative Examples 5 and 6 before storage and after storage at 40° C. for one month were applied on polyethylene terephthalate (PET) films with a 10-mil applicator and dried at 80° C. for 10 minutes. After the films were cut in an appropriate size, evaluations were conducted in terms of film forming property, adhesion, water resistance and solvent resistance according to the following basis. The results are shown in Tables 15 and 16. As to adhesion and water resistance, the evaluations were conducted according to the basis hereinbefore mentioned.

Filmforming property
  Surfaces of the paint films were observed visually and with a loupe. The paints films without cracks were evaluated as ○ and those with some cracks were evaluated as Δ.

Solvent resistance
  After the above-prepared paints films were soaked in a mixed solution of toluene/petroleum benzine (weight ratio of 1/1) at 20° C. for 2 days, the paint films were observed. Consequently, the paint films without change after soaking were evaluated as ○, those which were damaged by a solvent were evaluated as Δ, and those in which the PET films of base material were completely exposed were evaluated as X.

TABLE 15

|  | Examples | | | | | | | |
|---|---|---|---|---|---|---|---|---|
|  | 10 | | 11 | | 12 | | 13 | |
|  | before storage | after storage | before storage | after storage | before storage | after storage | before storage | after storage |
| Filmforming property | ○ | ○ | ○ | ○ | ○ | Δ | ○ | Δ |
| Adhesion | ○ | ○ | ○ | ○ | ○ | ○ | ○ | ○ |
| Water resistance | ○ | ○ | ○ | ○ | ○ | ○ | ○ | ○ |
| Solvent resistance | ○ | ○ | ○ | ○ | ○ | ○ | ○ | ○ |

TABLE 16

|  | Comparative Examples | | | |
|---|---|---|---|---|
|  | 5 | | 6 | |
|  | before storage | after storage | before storage | after storage |
| Filmforming property | ○ | Δ | ○ | ○ |
| Adhesion | ○ | ○ | ○ | ○ |
| Water resistance | ○ | ○ | X | X |
| Solvent resistance | ○ | ○ | X | X |

From the results shown in Table 15, the following are known. The emulsion compositions of Examples 10 and 11 before and after storage are excellent in all evaluations in terms of filmforming property, adhesion, water resistance and solvent resistance. Regarding the emulsion compositions of Examples 12 and 13 after storage, the filmforming property deteriorates compared to those before storage, and the stability is slightly inferior to the emulsion compositions of Examples 10 and 11. In the meantime, from the results shown in Table 16, the following are known. The emulsion composition of Comparative Example 5 before storage is excellent in all the evaluations in terms of filmforming property, adhesion, water resistance and solvent resistance. However, after storage for one month, the filmforming property deteriorates since a minimum filmforming temperature (MFT) increases. As to Comparative Example 6, since the emulsion composition neither contains GMA nor crosslinks, it, before and after storage, is inferior in water resistance and solvent resistance.

EXAMPLE 14

This examples describes a one-part cold crosslinking emulsion composition of the first embodiment.

70 parts of water and 1 part of Levenol WZ (a surfactant, manufactured by Kao Corporation) were added to a four neck flask equipped with a mixing blade, a thermometer and a reflux condenser. The mixture was then heated so that its inside temperature was 70° C. Under these conditions, an aqueous solution of a polymerization initiator (in which 0.3 part of potassium peroxide was dissolved in 10 parts of water) was dropwise added thereto over the course of five hours while an emulsifying liquid R, shown in Table 17 below, containing the forming material of Component (A), a chain transfer agent and the like was dropwise added over the course of two hours so as to complete the 0.5 hour of a maturing reaction. Subsequently, an emulsifying liquid S, shown in Table 17 below, containing the forming material of Component (B), a low molecular weight monofunctional epoxy compound (Component (C)), a chain transfer agent and the like was dropwise added over the course of two hours so as to complete 2 hours of a maturing reaction. After the resultant product was cooled, 2 parts of aqueous ammonia was added thereto. Thus, the targeted one-part cold crosslinking emulsion composition (50% concentration of a solid portion) of the first embodiment was obtained. In the meantime, molar amounts of the low molecular weight monofunctional epoxy compound (Component (C)) and the acrylic acid were $1.45 \times 10^{-2}$ mole and $6.76 \times 10^{-2}$ mole, respectively, and a molar ratio of acrylic acid/Component (C) was 4.7.

EXAMPLE 15

Emulsifying liquids R' and S' at the mixing ratios shown in the following Table 17 were used. Except those changes, the same procedure as that of Example 14 was repeated to prepare a one-part cold crosslinking emulsion composition (50% concentration of a solid portion) of the first embodiment. In the meantime, molar amounts of the low molecular weight monofunctional epoxy compound (Component (C)) and the acrylic acid were $13.5 \times 10^{-2}$ mole and $6.8 \times 10^{-2}$ mole, respectively, and a molar ratio of acrylic acid/Component (C) was 0.5.

EXAMPLE 16

The example describes a one-part cold crosslinking emulsion composition of the second embodiment.

An emulsifying liquid T (containing a low molecular weight monofunctional epoxy compound (Component (C))) shown in the following Table 17 was used instead of the emulsifying liquid R of Example 14, and an emulsifying liquid U (not containing the low molecular weight monofunctional epoxy compound (Component (C))) shown in the following Table 17 was used instead of the emulsifying liquid S of Example 14. Except those changes, the same procedure as that of Example 14 was repeated to prepare a one-part cold crosslinking emulsion composition (50% concentration of a solid portion) of the low molecular weight monofunctional epoxy compound (Component (C)) and the acrylic acid were $1.45 \times 10^{-2}$ mole, respectively, and a molar ratio of acrylic acid/Component (C) was 4.7.

EXAMPLE 17

Emulsifying liquids T' and U' at the mixing ratios shown in the following Table 17 were used. Except those changes, the same procedure as that of Example 16 was repeated to prepare a one-part cold crosslinking emulsion composition (50% concentration of a solid portion) of the second embodiment. In the meantime, molar amounts of the low molecular weight monofunctional epoxy compound (Component (C)) and the acrylic acid were $1.4 \times 10^{-2}$ mole and $6.8 \times 10^{-2}$ mole, respectively, and a molar ratio of acrylic acid/Component (C) was 5.0.

Comparative Example 7

Instead of the emulsifying liquid S of Example 14, an emulsifying liquid V (not containing a low molecular weight monofunctional epoxy compound (Component (C))) shown in the following Table 18 was used. Except that change, the same procedure as that of Example 14 was repeated to prepare an emulsion composition (50% concentration of a solid portion).

Comparative Example 8

Instead of the emulsifying liquid R of Comparative Example 7, an emulsifying liquid W (not containing GMA) shown in the following Table 18 was used. Except that change, the same procedure as that of Comparative Example 7 was repeated to prepare an emulsion composition (50% concentration of a solid portion).

TABLE 17

| | ④ Adhesives (parts) | | | | | | | |
|---|---|---|---|---|---|---|---|---|
| | Examples | | | | | | | |
| | 14 | | 15 | | 16 | | 17 | |
| | Kind of emulsifying liquids | | | | | | | |
| | R | S | R' | S' | T | U | T' | U' |
| 2-ethylhexyl acrylate | 40 | 40 | 40 | 40 | 40 | 40 | 40 | 40 |
| Butyl acrylate | 9 | 5 | 9 | 5 | 9 | 5 | 9 | 5 |
| Glycidyl methacrylate (GMA) | 1 | — | 1 | — | 1 | — | 1 | — |
| Epoxy compound * | — | 2.5 | — | 23.2 | 2.5 | — | 2.4 | — |
| Acrylic acid | — | 5 | — | 5 | — | 5 | — | 5 |
| Emulgen 950 (manufactured by Kao Corporation) | 1 | 1 | 1 | 1 | 1 | 1 | 1 | 1 |
| Water | 14 | 14 | 14 | 14 | 14 | 14 | 14 | 14 |

*: a low molecular weight monofunctional epoxy compound (Denacol EX-121 having a molecular weight of 172, manufactured by Nagase Chemicals Limited.)

TABLE 18

③ Adhesives (parts)

|  | Comparative Examples | | | |
|---|---|---|---|---|
|  | 7 | | 8 | |
|  | Kind of emulsifying liquids | | | |
|  | R | V | W | V |
| 2-ethylhexyl acrylate | 40 | 40 | 40 | 40 |
| Butyl acrylate | 9 | 5 | 10 | 5 |
| Glycidyl methacrylate (GMA) | 1 | — | — | — |
| Epoxy compound * | — | — | — | — |
| Acrylic acid | — | 5 | — | 5 |
| Emulgen 950 (manufactured by Kao Corporation) | 1 | 1 | 1 | 1 |
| Water | 14 | 14 | 14 | 14 |

*: a low molecular weight monofunctional epoxy compound (Denacol EX-121 having a molecular weight of 172, mm), and a weight was suspended to one of the two pieces of the tape. Then, slippage in width for the laminated area at 40° C. and 60° C. after 2 hours were measured. Consequently, "no slippage" was indicated for the tapes without slippage, measured figures of the slippage were indicated for the tapes with slippage, and "fall" was indicated for the tapes in which the slippage was so large that the tape with the weight fell.

The resultant emulsion compositions of Examples 14–17 and Comparative Examples 7 and 8 before storage and after storage at 40° C. for one month were applied on PET films in such a manner that a film thickness after drying is 20 μm. The films were dried at 80° C. for 2 minutes so as to form pressure sensitive adhesive tape. With the pressure sensitive adhesive tape thus obtained, evaluations in terms of tack, adhesive strength and holding power were conducted according to the following basis. The results re shown in Tables 19 and 20 below.

Tack

Tack was measured by a ball rotation method according to Japanese Industrial Standard (JIS) Z 0237.

Adhesive strength

180° peel adhesive strength according to JIS Z 0237 was measured (adherend: stainless steel plate).

Holding power

Holding power was measured by a method according to in JIS Z 0237. Namely, two pieces of the pressure sensitive adhesive tape were laminated (laminated are of 20 mm×20 mm), and a weight was suspended to one of the two pieces of the tape. Then, slippage in width for the laminated area at 40° C. and 60° C. after 2 hours were measured. Consequently, "no slippage" was indicated for the tapes without slippage, measured figures of the slippage were indicated for the tapes with slippage, and "fall" was indicated for the tapes in which the slippage was so large that the tape with the weight fell.

TABLE 19

|  | Examples | | | | | | | |
|---|---|---|---|---|---|---|---|---|
|  | 14 | | 15 | | 16 | | 17 | |
|  | before storage | after storage | before storage | after storage | before storage | after storage | before storage | after storage |
| Tack | 10 | 10 | 10 | 10 | 10 | 8 | 10 | 8 |
| Adhesive strength (g/25 mm) | 800 | 800 | 800 | 800 | 800 | 700 | 800 | 650 |
| Holding 40° C. property | no slippage | no slippage | no slippage | no slippage | no slippage | no slippage | no slippage | no slippage |
| Holding 60° C. property | 0.1 mm or less | 0.1 mm or less | 0.1 mm or less | 0.1 mm or less | 0.1 mm or less | 0.1 mm or less | 0.1 mm or less | 0.1 mm or less |

TABLE 20

|  | Comparative Examples | | | |
|---|---|---|---|---|
|  | 7 | | 8 | |
|  | before storage | after storage | before storage | after storage |
| Tack | 10 | 7 | 16 | 16 |
| Adhesive property (g/25 mm) | 800 | 500 | 1200 | 1200 |
| Holding 40° C. property 60° C. | no slippage 0.1 mm or less | no slippage 0.1 mm or less | 5 mm fall | 5 mm fall |

From the results shown in Table 19, the following are known. The emulsion compositions of Examples 14 and 15 before and after storage are excellent in all the evaluations in terms of tack, adhesive strength and holding property. Regarding the emulsion compositions of Examples 16 and 17 after storage, the tack and adhesive strength deteriorate, and they are slightly inferior in stability to the emulsion compositions of Examples 14 and 15. In the meantime, from the results Shown in Table 20, the following are known. The emulsion composition of Comparative Example 7 before storage is excellent in all the evaluations in terms of tack, adhesive strength and holding property. However, after storage for one month, the tack is reduced and the adhesive strength deteriorates. As to Comparative Example 8, since the emulsion composition neither contains GMA nor crosslinks, it, before and after storage, is inferior in holding property.

EFFECT OF THE INVENTION

As described hereinbefore, the present invention related to a one-part cold crosslinking emulsion composition containing, in an aqueous medium, a double-structure fine grain comprising Component (A) and Component (B) covering the same, wherein Component (C) is contained in at least one of Components (A) and (B). Therefore, Component (C) anticipatorily reacts with carboxyl groups around an interface between Components (A) and (B) so that the carboxyl groups around the interface are reduced in number, by which the carboxyl groups localize around the surface of the fine grain. Thus, since the carboxyl groups around the interface are reduced in number and the formation of three-dimensional network structures, as conventionally seen, is prevent, rapid increase in molecular weight under a high temperature may be restrained.

As a result, a one-part cold crosslinking emulsion composition according to the present invention exhibits excellent permeability. Further, a paint film using the same has excellent adhesion, impregnation-reinforcing property, water resistance and adhesion to a top coat paint film. Furthermore, such an emulsion composition has the same, or greater, effect in reinforcing base material as that of conventional solvent type resins, and is safe and does not become a source for pollution. Hence, the one part cold crosslinking emulsion composition according to the present invention may be used for gloss coatings, sealers for inorganic building materials, coating agents for plastics, tackiness agents, fiber processing and the like.

In addition, the one-part cold crosslinking emulsion composition according to the present invention may be manufactured, when forming a fine grain comprising Component (A) in an aqueous medium and covering the periphery of the fine grain made of Component (A) with Component (B) so as to prepare a double-structure fine grain, by containing Component (C) in at least one of Components (A) and (B). Consequently, a one-part cold crosslinking emulsion composition which is excellent in storage stability may be mass-produced with reduced costs.

Figure 1:
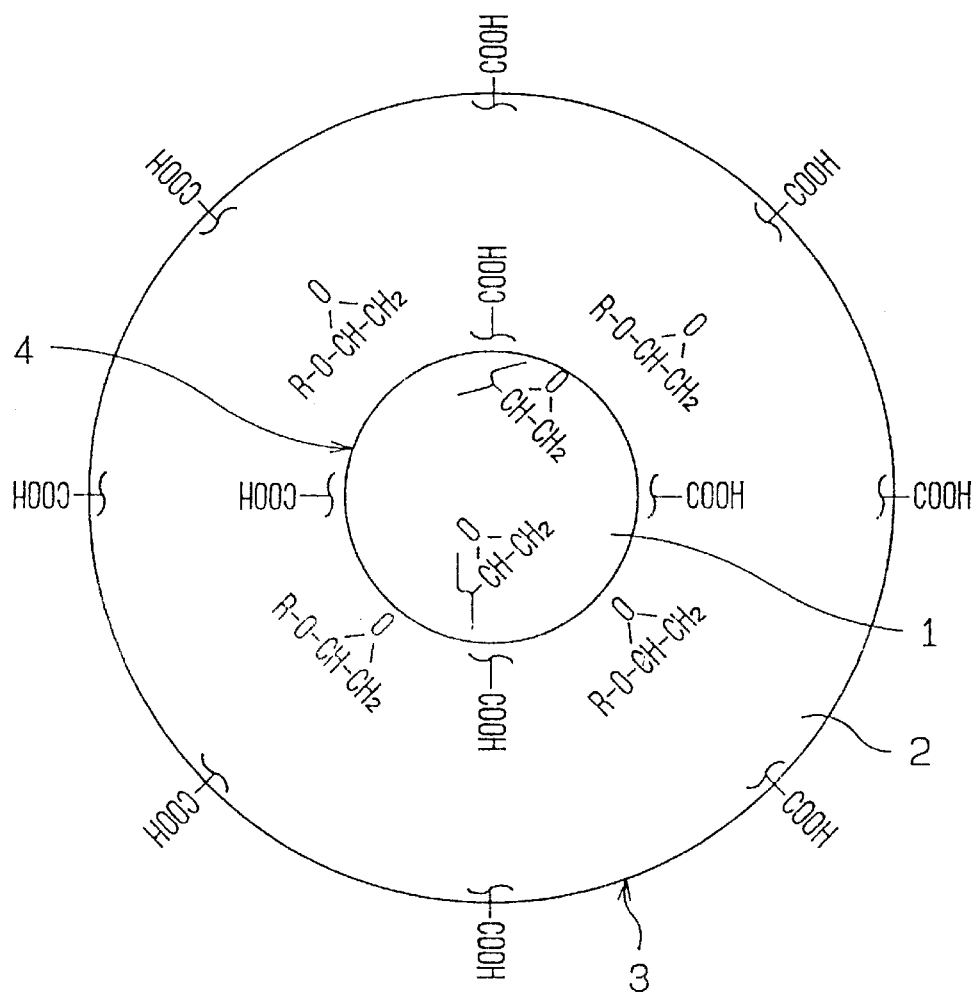
FIG. 1 is a schematic view of the structure of a double-structure fine grain comprised in a one-part cold crosslinking emulsion composition as a first embodiment.
Figure 2:
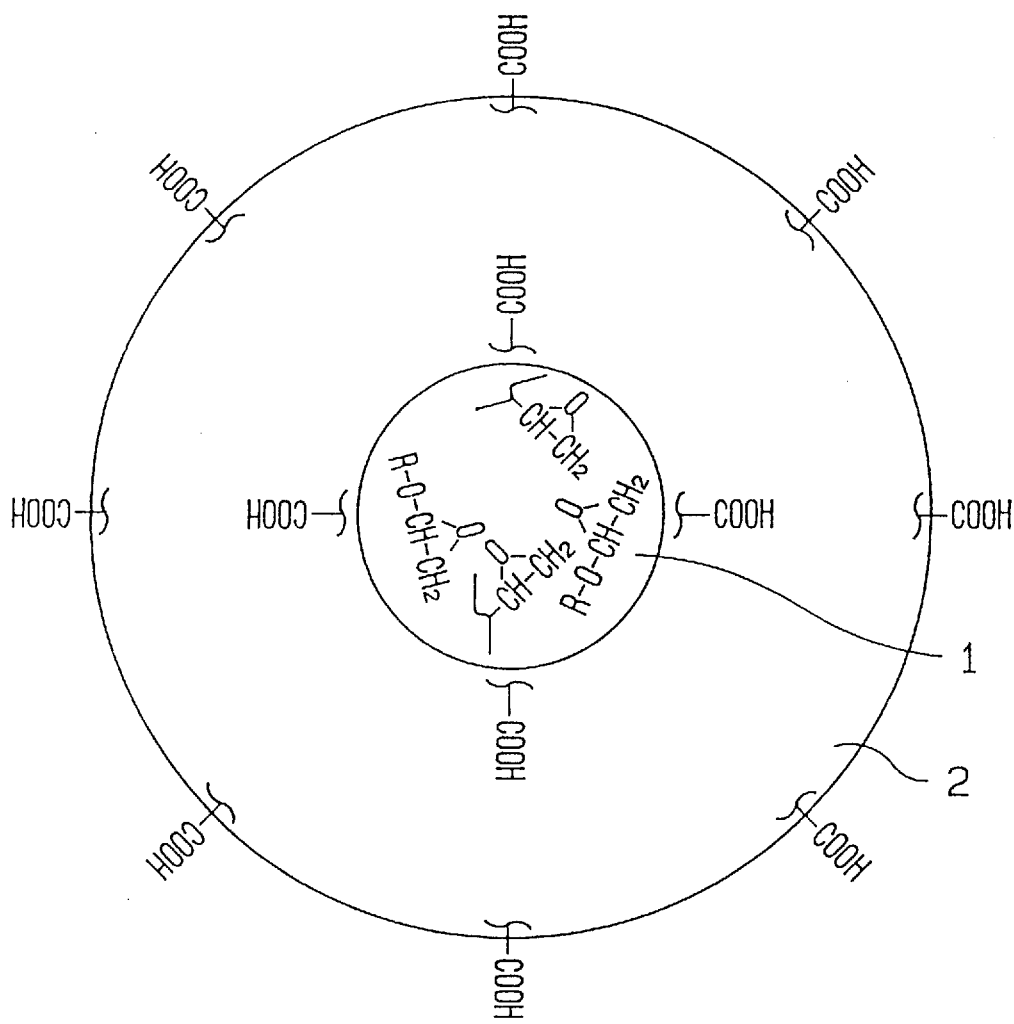
FIG. 2 is a schematic view of the structure of a double-structure fine grain comprised in one-part cold crosslinking emulsion composition as a second embodiment.
Figure 3:
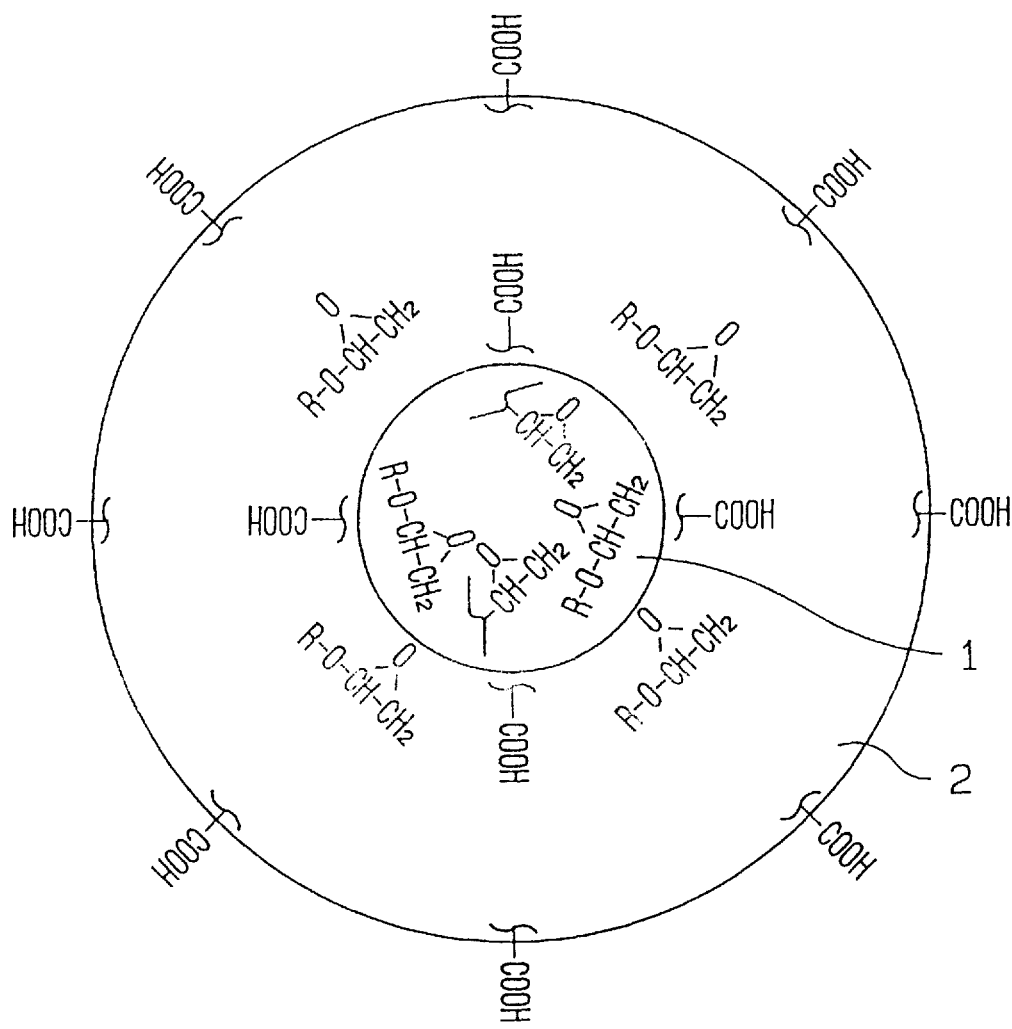
FIG. 3 is a schematic view of the structure of a double-structure fine grain comprised in a one-part cold crosslinking emulsion composition as a third embodiment.
Figure 4:
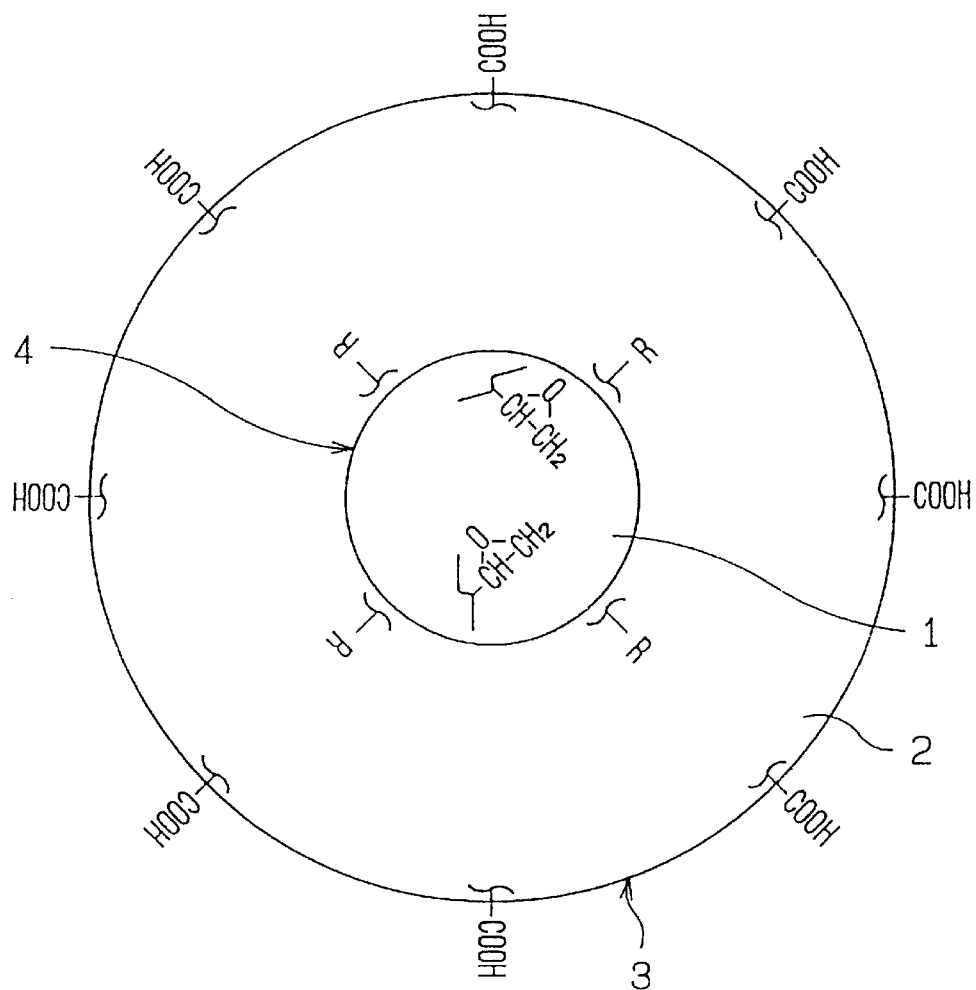
FIG. 4 is a schematic view of the structure of a double-structure fine grain comprised in a one-part cold crosslinking emulsion composition of the first embodiment after storage.
Figure 5:
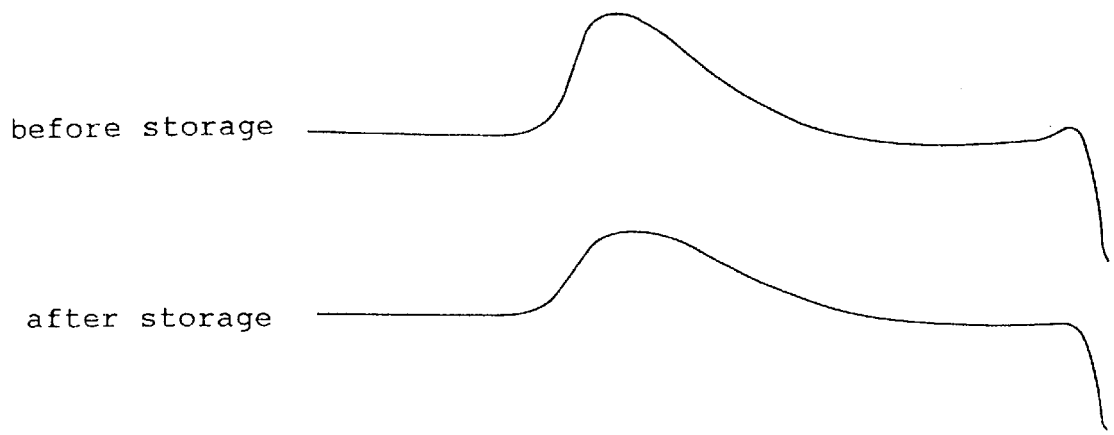
FIG. 5 shows a chart (a) showing a molecular weight distribution of the emulsion composition of Example 1 before and after storage, and a chart (b) showing a molecular weight distribution of the emulsion composition of Example 2 before and after storage.
Figure 5:
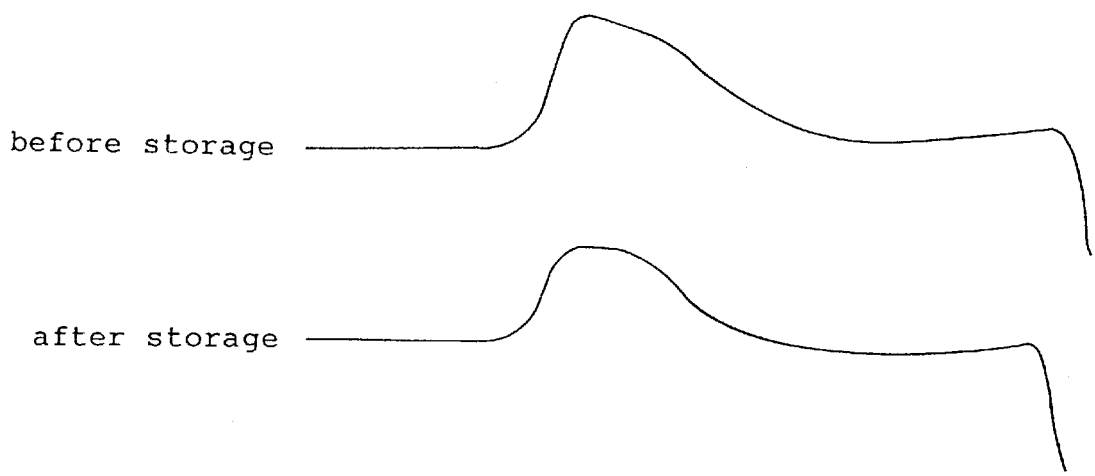
Figure 6:
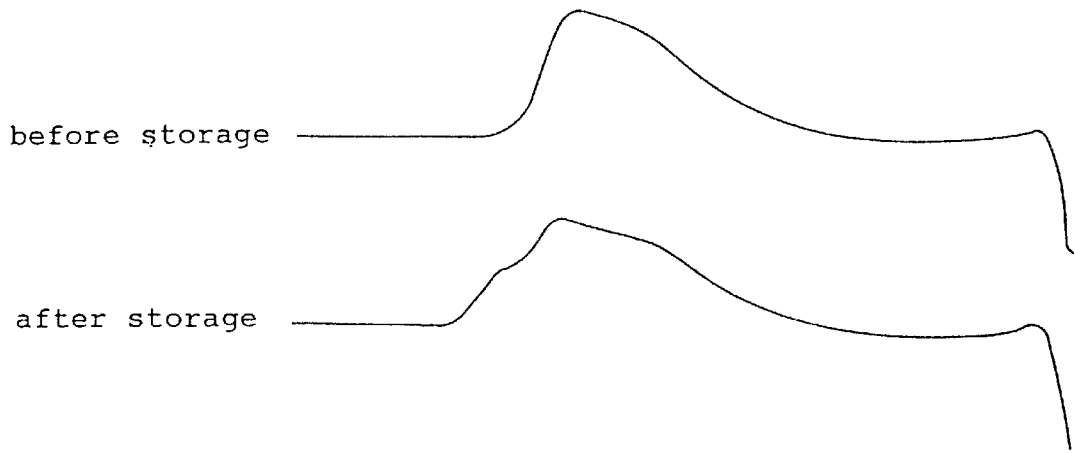
FIG. 6 shows a chart (a) showing a molecular weight distribution of the emulsion composition of Example 3 before and after storage, and a chart (b) showing a molecular weight distribution of the emulsion composition of Example 4 before and after storage.
Figure 6:
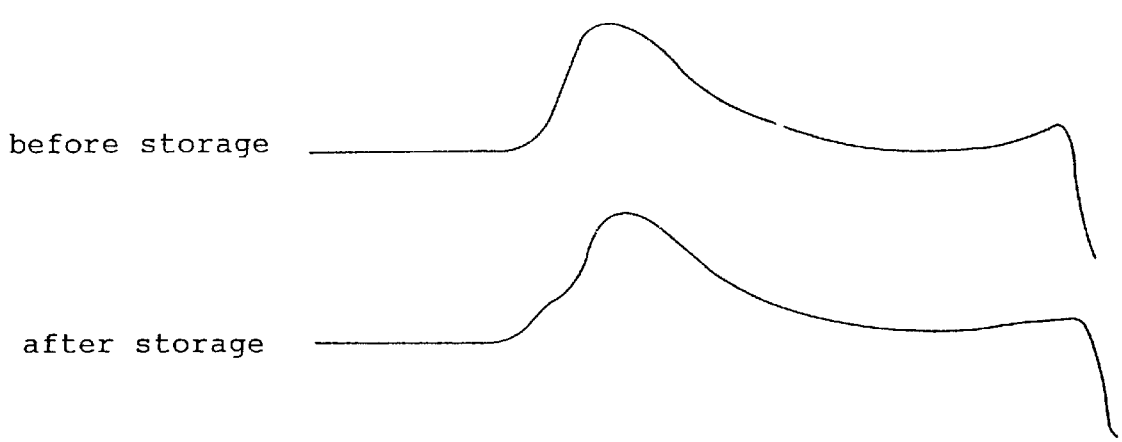
Figure 7:
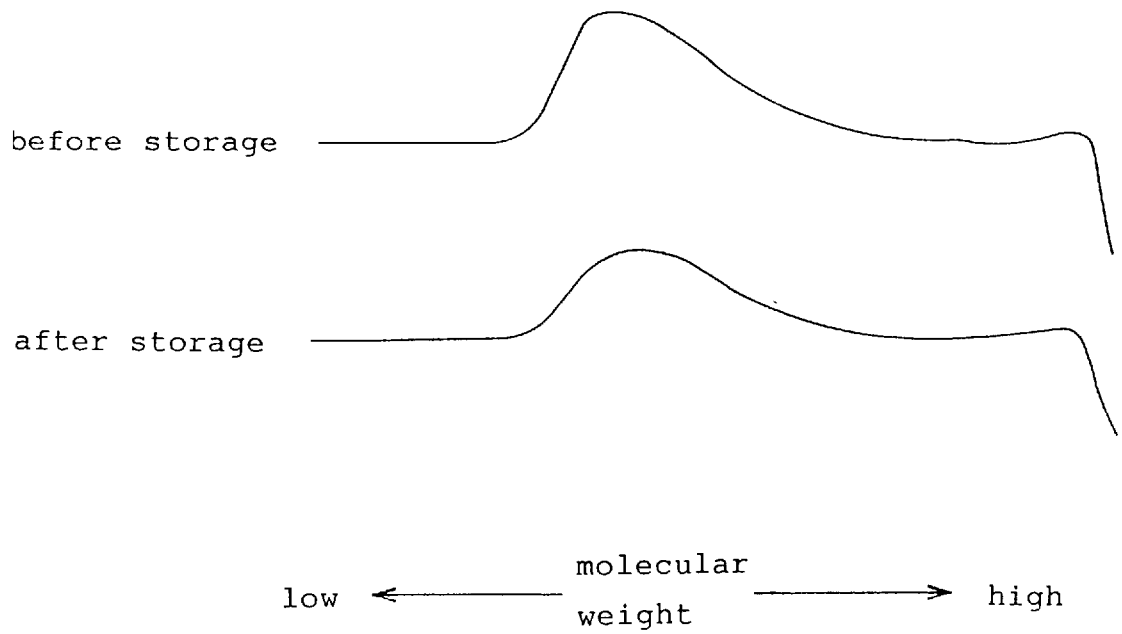
FIG. 7 is a chart showing a molecular weight distribution of the emulsion composition of Example 5 before and after storage.
Figure 8:
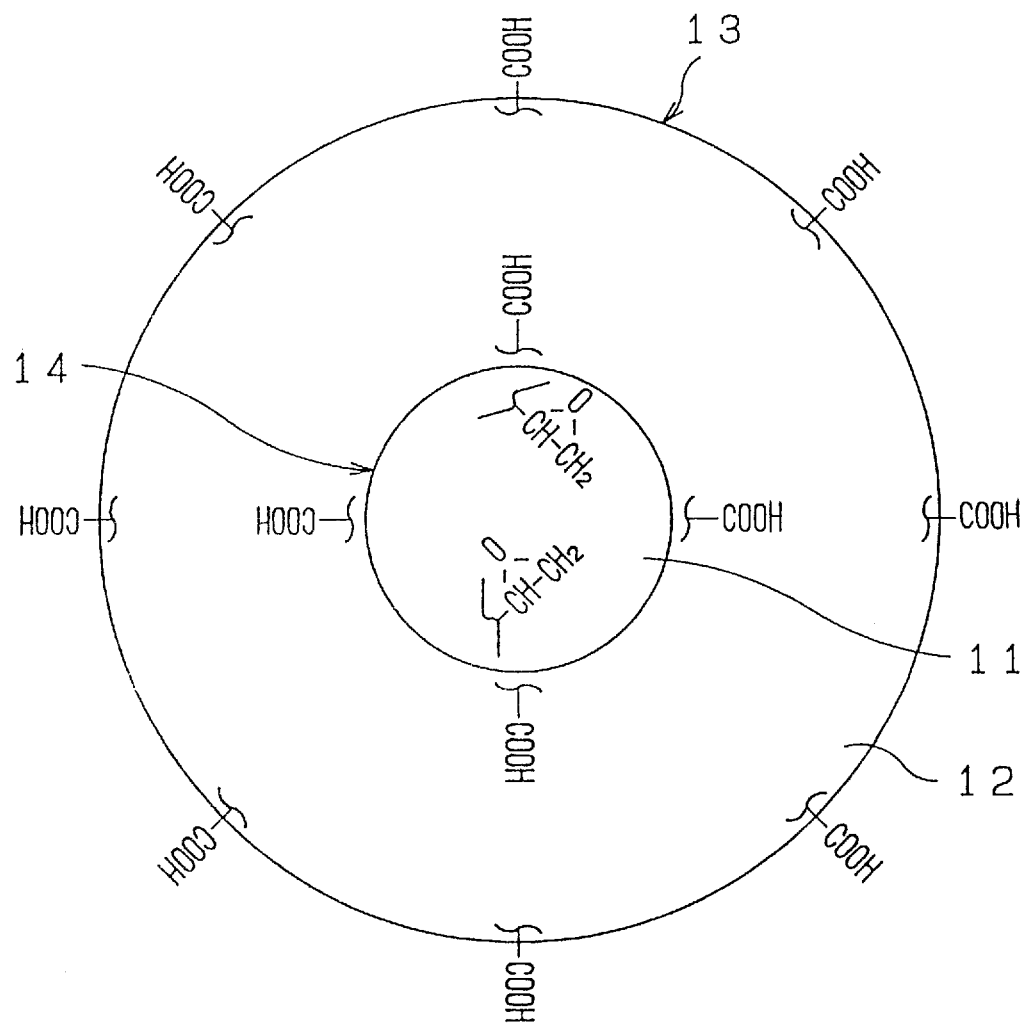
FIG. 8 is a schematic view of the structure of a double-structure fine grain comprised in a conventional emulsion composition.
Figure 9:
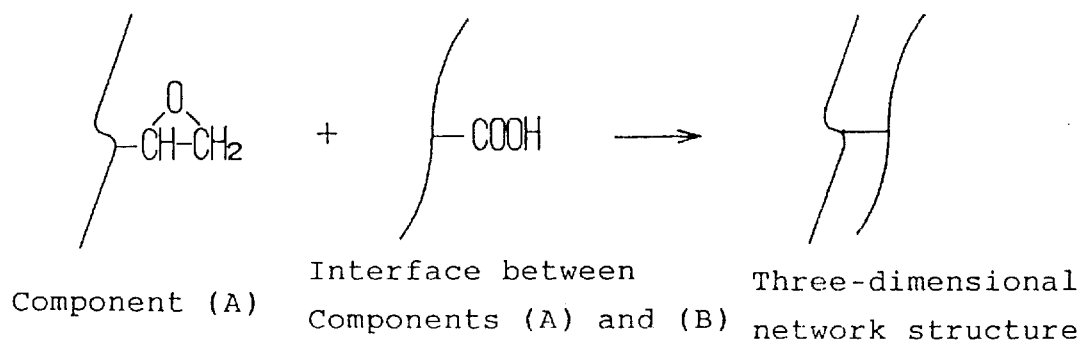
FIG. 9 is an explanatory view schematically showing the formation of a three-dimensional network structure by reacting an epoxy group of Component (A) with a carboxyl group around Components (A) and (B).
Figure 10:
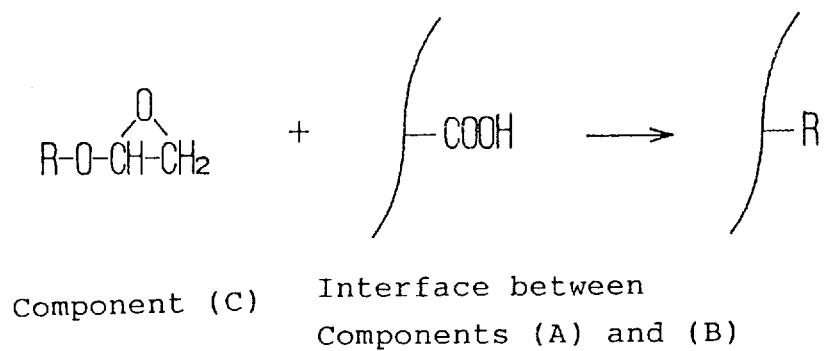
FIG. 10 is an explanatory view schematically showing the reaction between Component (C) and carboxyl groups around Components (A) and (B).

What is claimed:

1. A one-part cold crosslinking emulsion composition containing, in an aqueous medium, a double-structure fine grain comprising the following Component (A) and the following Component (B) covering Component (A), wherein the following Component (C) is contained in at least one of Components (A) and (B):

(A) a copolymer comprising an epoxy group-containing monomer and an ethylenic unsaturated monomer;

(B) a copolymer comprising an unsaturated carboxylic acid and an ethylenic unsaturated monomer; and (C) a low molecular weight monofunctional epoxy compound.

2. The one-part cold crosslinking emulsion composition according to claim 1, wherein Component (C) is contained in Component (B).

3. A method of manufacturing a one-part cold crosslinking emulsion composition comprising steps of:

preparing a fine grain containing the following Component (A) in an aqueous medium; and covering a periphery of the fine grain made of Component (A) with the following Component (B) so as to prepare a double-structure fine gain, wherein the method further comprises a step of containing the following Component (C) in at least one of Components (A) and (B):

(A) a copolymer comprising an epoxy group-containing monomer and an ethylenic unsaturated monomer;

(B) a copolymer comprising an unsaturated carboxylic acid and an ethylenic unsaturated monomer; and (C) a low molecular weight monofunctional epoxy compound.

4. The method of producing a one-part cold crosslinking emulsion composition according to claim 3, wherein the step of preparing a fine grain containing Component (A) in an aqueous medium is proceeded by copolymerizing an epoxy group-containing monomer and an ethylenic unsaturated monomer in an aqueous solution and also the step of covering a periphery of the fine grain made of Component (A) with Component (B) so as to prepare a double-structure fine grain is proceeded by dispersing and copolymerizing an unsaturated carboxylic acid and an ethylenic unsaturated monomer in an aqueous solution in which an epoxy group-containing monomer and an ethylenic unsaturated monomer are copolymerized.

* * * * *